(12) United States Patent
Sugiyama (10) Patent No.: US 11,153,007 B2
(45) Date of Patent: Oct. 19, 2021

(54) OPTICAL DEVICE, OPTICAL MODULE USING THE SAME, AND TEST METHOD FOR OPTICAL DEVICE

(71) Applicant: FUJITSU OPTICAL COMPONENTS LIMITED, Kawasaki (JP)

(72) Inventor: Masaki Sugiyama, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 16/789,084

(22) Filed: Feb. 12, 2020

(65) Prior Publication Data
US 2020/0295825 A1 Sep. 17, 2020

(30) Foreign Application Priority Data

Mar. 15, 2019 (JP) .............................. JP2019-048904

(51) Int. Cl.
*H04B 10/077* (2013.01)
*H04B 10/25* (2013.01)
*H04B 10/50* (2013.01)
*G02B 6/42* (2006.01)

(52) U.S. Cl.
CPC ......... *H04B 10/077* (2013.01); *G02B 6/4286* (2013.01); *H04B 10/25* (2013.01); *H04B 10/50* (2013.01)

(58) Field of Classification Search
CPC ...... H04B 10/25; H04B 10/50; H04B 10/077; G02B 6/4286; G01R 31/265; G01R 31/318511; G01R 31/318513; G01R 1/0491; G03F 7/0483; H01S 5/0042

USPC .......................................................... 398/16
See application file for complete search history.

(56) References Cited

U.S. PATENT DOCUMENTS

| 8,742,782 | B2* | 6/2014 | Ouyang | ........... G01R 31/31728 |
| | | | | 324/750.3 |
| 8,916,874 | B2* | 12/2014 | Whitbread | ............. G01M 11/33 |
| | | | | 257/48 |
| 9,479,286 | B2* | 10/2016 | Sugama | .................. H04B 10/40 |
| 10,042,131 | B1* | 8/2018 | Lesea | ...................... G02B 6/124 |
| 10,732,029 | B2* | 8/2020 | Stone | .................. G01R 31/3187 |
| 2005/0194990 | A1* | 9/2005 | Gothoskar | ............... G02B 6/30 |
| | | | | 324/754.23 |
| 2007/0058976 | A1* | 3/2007 | Tatum | ................... H04B 10/801 |
| | | | | 398/99 |
| 2018/0292680 | A1 | 10/2018 | Baehr-Jones et al. | |
| 2018/0313718 | A1* | 11/2018 | Traverso | ................. G02B 6/305 |
| 2019/0170945 | A1* | 6/2019 | Fortusini | .................. G02B 6/13 |
| 2020/0027798 | A1* | 1/2020 | Lin | ......................... G02B 1/11 |
| 2020/0033228 | A1* | 1/2020 | Piazza | ............ G01R 31/318511 |
| 2020/0124792 | A1* | 4/2020 | Cho | .................... G02B 6/12004 |

FOREIGN PATENT DOCUMENTS

JP 2005-286803 A 10/2005

* cited by examiner

*Primary Examiner* — Dalzid E Singh
(74) *Attorney, Agent, or Firm* — Staas & Halsey, LLP (57) ABSTRACT

An optical device has an optical transmitter circuit formed in a substrate, a first port configured to output an optical signal generated by the optical transmitter circuit from an edge of the substrate during services and to input a test light from the edge of the substrate during a test, and a photodetector configured to detect the test light input from the first port.

16 Claims, 7 Drawing Sheets

OPTICAL DEVICE, OPTICAL MODULE USING THE SAME, AND TEST METHOD FOR OPTICAL DEVICE

CROSS-REFERENCE TO RELATED APPLICATIONS

This application is based upon and claims priority to earlier filed Japanese Patent Application No. 2019-048904 filed Mar. 15, 2019, which is incorporated herein by reference in its entirety.

FIELD

The present invention relates to an optical device used in optical communications, an optical module using the same, and a test method for an optical device.

BACKGROUND

To reduce the size of optical transceivers used in optical communications, photonic integrated circuits (ICs) that integrate various optical elements such as an optical modulator, a light receiving element, and an optical multiplexer demultiplexer on a silicon substrate have been developed.

In the mass production process of photonic ICs, individual chips are tested and inspected. It is efficient to test individual chips on a wafer before the wafer is cut into dice. When a test is performed in a wafer state (which may be referred to as "wafer-level testing"), a probe is pressed against an electrode pad formed in a chip area on a wafer in order for inputting and outputting electric signals, while light is input and output to and from the wafer surface in a scribe region using an optical fiber.

Figure 1:
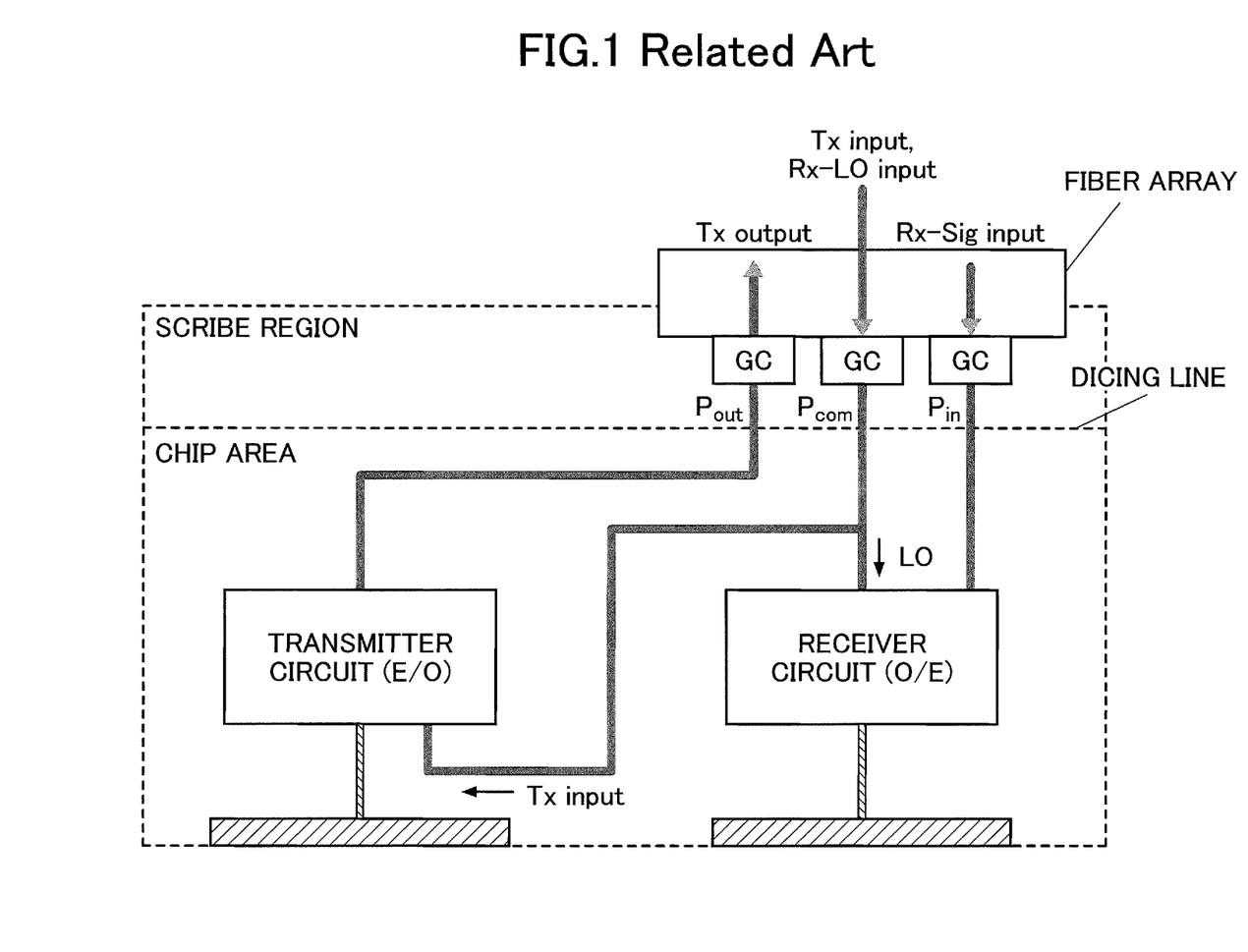
FIG. 1 is a schematic diagram illustrating conventional wafer-level testing.

As illustrated in FIG. 1, grating couplers (denoted as "GC"s in the figure) are provided in the scribe region in order to input and output light to and from the wafer surface. Such grating couplers include a received signal input GC (denoted as "Rx-Sig input" in the figure), transmission light and reference light input GC (denoted as "Tx input, Rx-LO input" in the figure), and signal transmission GC (denoted as "Tx-output" in the figure). The end faces of optical fibers are brought to be close to these GCs to input and extract light beams.

Photonic waveguides extending from the GCs to the chip area are connected to the signal output port $P_{out}$ of the transmission circuit, the signal input port $P_{in}$ of the receiver circuit, and the optical input port $P_{com}$ used common to transmission and reception, respectively. With this configuration, light can be input to the transmission circuit and the receiver circuit from the wafer surface, and testing or inspection of a chip can be carried out in a wafer state. After the testing, the wafer is cut along the dicing line and separated into individual photonic IC chips. The GCs used for the testing are cut out from the photonic IC chip and do not remain on the chip.

PRIOR ART DOCUMENTS

Patent Document 1: Japanese Patent Application. Laid-open Publication No. 2005-286803A
Patent Document 2: U.S. Patent Application Publication No. 2018/0292680

SUMMARY

According to one aspect of the invention, an optical device has an optical transmitter circuit formed in a substrate,
a first port configured to output an optical signal generated by the optical transmitter circuit from an edge of the substrate during services and to input a test light from the edge of the substrate during a test, and
a photodetector configured to detect the test light input from the first port.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

The configuration of FIG. 1 is incapable of evaluating connection loss between the optical fiber and the photonic waveguide at the edge of the chip. It may be conceivable to, after dicing, press an optical fiber array against the edge of the chip to input a light beam directly to the photonic waveguide formed in the chip substrate. However, this method requires precise alignment between optical axes in order for bringing the optical axes of multiple optical fibers into alignment with the photonic waveguide cores. The photonic waveguides fabricated in a photonic IC by silicon photonics technology is small in size, and it takes time to complete the alignment between the optical fiber and the photonic waveguide. It is desirable to provide a configuration and a method that enable testing or inspection of an optical device in a short time.

In the embodiment, a configuration in which connection loss between a photonic waveguide and an external optical fiber can be measured in a short time at an edge of the substrate of an optical device is achieved. Prior to describing a specific structure of the embodiment, a configuration conceivable during a process leading to the embodiment and a problem arising therefrom will be explained.

Figure 2:
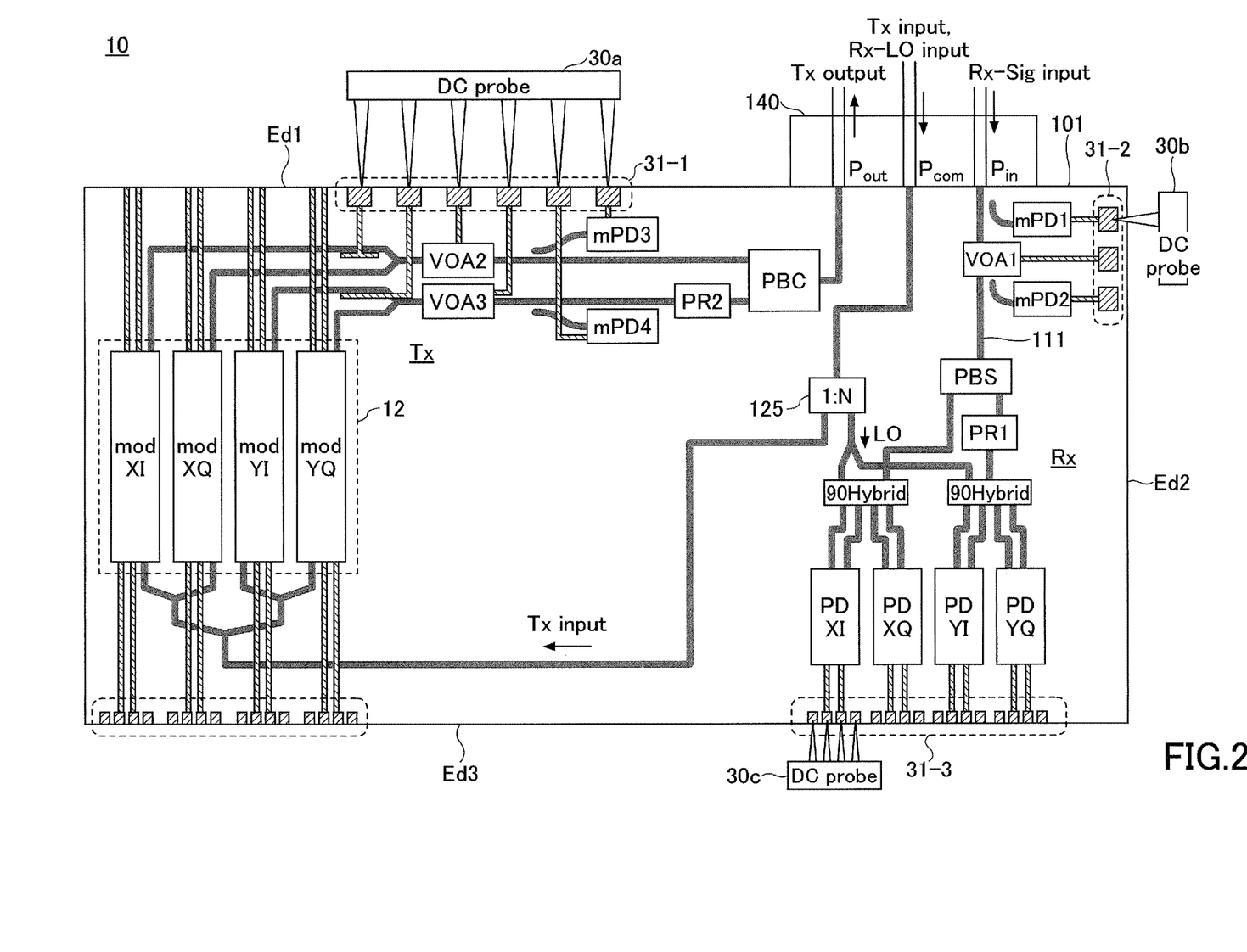
FIG. 2 illustrates a structure conceivable for testing at a chip edge.

FIG. 2 illustrates a configuration of an optical device conceivable for testing a fiber connection loss. A photonic IC 10, which is an example of an optical device, includes an optical transmitter circuit Tx having optical modulators (modXI, modXQ, modYI, modYQ) and an optical receiver circuit Rx having photodetectors (PDXI, PDXQ, PDYI, PDYQ).

The optical receiver circuit Rx also has a variable optical attenuator VOA1, monitor detectors mPD1 and mPD2, a polarization beam splitter PBS, a polarization rotator PR1, and a 90-degree hybrid optical mixer (90Hybrid), in addition to the photodetectors.

The optical transmitter circuit Tx also has variable optical attenuators VOA2 and VOA3, monitor detectors mPD3 and mPD4, a polarization rotator PR2, and a polarization beam combiner PBC, in addition to the optical modulator.

A fiber array 140 is abutted against the first edge Ed1 of the substrate 101 of the photonic IC 10, and optical fibers are connected to the signal input port $P_{in}$ of the optical receiver circuit Rx, the signal output port $P_{out}$ of the optical transmitter circuit Tx, and the common input port $P_{com}$, respectively. The common input port $P_{com}$ is used in common by the optical transmitter circuit Tx and the optical receiver circuit Rx, and the light incident from the common input port $P_{com}$ is split by a 1:N optical coupler 125. One of the split light components is supplied to the optical transmitter circuit Tx to generate a modulated optical signal. The other of the split light components is supplied to the optical receiver circuit Rx and used as local oscillating (LO) light for detecting the received signal.

The fiber connection loss of the signal input port $P_{in}$ at the receiver side can be evaluated by inputting test light to the signal input port $P_{in}$ and measuring the photocurrent detected by the monitor detector mPD1 provided on a path branched from the photonic input waveguide 111. The photocurrent output from the monitor detector mPD1 may be measured by bringing a direct-current (DC) probe 30b into physical contact with an electrode pad connected to the monitor detector mPD1 within the electrode pad array 31-2 provided along the second edge Ed2 of the photonic IC 10.

The fiber connection loss at the common input port $P_{com}$ can be evaluated by inputting test light to the common input port $P_{com}$ and measuring the photocurrent in any one of the photodetectors (for example, at PDXI). The photocurrent output from the photodetector PDXI may be measured by bringing the DC probe 30c into physical contact with an electrode pad group connected to the PDXI within the electrode pad array 31-3 provided along the third edge Ed3 of the photonic IC 10.

To evaluate the fiber connection loss of the signal output port $P_{out}$ at the transmitter side, light is input to the common input port $P_{com}$, and a portion of the input light is supplied to the Tx site. Then, the light output from the signal output port $P_{out}$ is extracted by the optical fiber to measure the output level. To do this measurement, at least a two-core optical fiber array is used and the optical axes of the optical fibers have to be aligned simultaneously at the common input port $P_{com}$ and the signal output port $P_{out}$.

In the photonic IC 10 using a silicon photonics technology, the size of the photonic waveguide is small. Even when a typical six-axis fiber alignment unit is used, it takes time to align the optical axis of an optical fiber. When the optical axis alignment is carried out at different port positions simultaneously using a two-core optical fiber array, the alignment time is further increased.

Besides, to evaluate the loss of the optical transmitter circuit Tx, the electric current and the voltage to be applied to each of the optical modulators (modXI, modXQ, modYI, and modYQ) are regulated to adjust the phase of light, and the output power levels of the variable optical attenuators VOA2 and VOA3 are adjusted. For these adjustments, the DC probe 30a is brought into contact with the electrode pad array 31-1 provided along the first edge Ed1 of the photonic IC 10 to monitor the modulated light signal. Due to the adjustment of the electric current or voltage level for optical modulation, the time required for preparation for the testing is further increased.

A novel configuration that enables measurement of the fiber connection loss at the edge of the substrate in a short time, while suppressing increase in the time required for preparation of the testing, is desired.

First Embodiment

Figure 3:
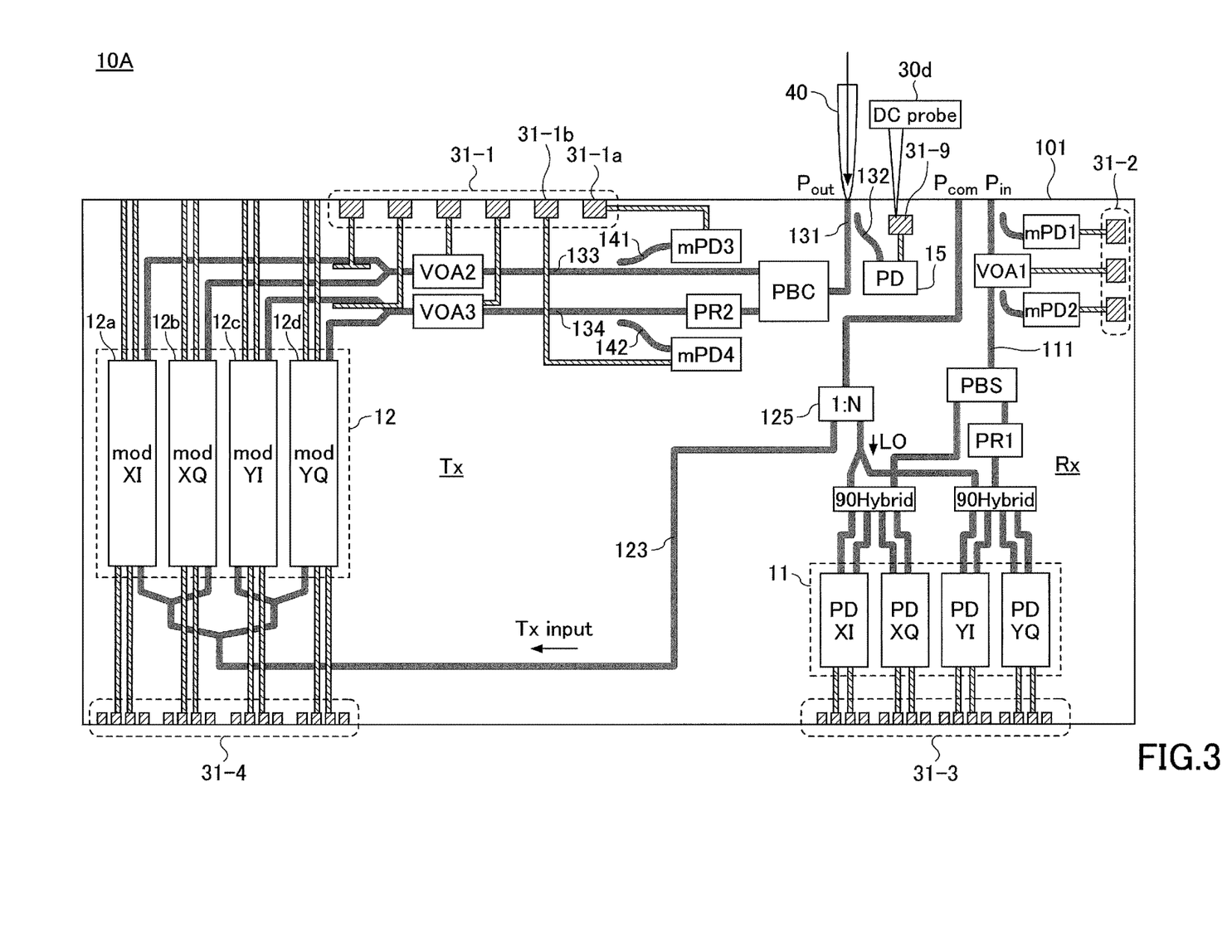
FIG. 3 is a schematic diagram of an optical device according to the first embodiment.

FIG. 3 is a schematic diagram of a photonic IC 10A according to the first embodiment. The photonic IC 10 is used as a front-end circuit of optical communication to perform optical-to-electric conversion and electric-to-optical conversion. In this embodiment, the fiber connection loss is measured at the edge of the substrate 101 using a single optical fiber.

The photonic IC 10A includes an optical transmitter circuit Tx having a modulator block 12 and an optical receiver circuit Rx having a photodetector block 11. During actual services, light emitted from a light source such as a laser diode (ID) is input to the common input port $P_{com}$, and the input light is split at a 1:N optical coupler 125. One of the split light components is guided to the optical transmitter circuit Tx, and the other is guided to the optical receiver circuit Rx.

In the optical transmitter circuit Tx, a high-frequency (RE) electric signal and a light beam output from the light source are input to each of the optical modulators 12a to 12d. In this example, the photonic IC 10A operates in a dual polarization-Quadrature Phase Shift Keying (DP-QPSK) scheme to produce four logical values using mutually orthogonal two polarizations and two phase components with a 90-degree phase difference; however, the invention is not limited to this example.

The optical phases of the light beams modulated by the RF signals at the respective optical modulators 12a to 12b are adjusted by DC biases, and the in-phase (I) component and the quadrature (Q) component are multiplexed at each of the polarization branches. The light multiplexed at each of the polarization branches is power-adjusted by one of the variable optical attenuators VOA2 and VOA3, and then subjected to polarization-multiplexing through the polarization rotator PR2 and the polarization beam combiner PBC. The polarization-multiplexed optical signal is output from the signal output port $P_{out}$.

A tap waveguide 141 is provided to a photonic waveguide 133 extending from the output of the VOA2, and a monitor detector mPD3 is connected to the tap waveguide 141. During actual services, the monitor detector mPD3 monitors a portion of the I-Q multiplexed optical signal at one of the polarization branches. Similarly, a tap waveguide 142 is provided to a photonic waveguide 134 extending from the output of the VOA3, and a monitor detector mPD4 is connected to the tap waveguide 142. During actual services, the monitor detector mPD4 monitors a portion of the I-Q multiplexed optical signal at the other polarization branch.

The outputs of the monitor detectors mPD3 and mPD4 are electrically connected to a part of the electrode pad array 31-1. During services, the monitoring results are extracted through electrical wiring; however, in the connection loss testing, it is unnecessary to use the monitor detectors mPD3 and mPD4.

One of the features of the embodiment is that, for the testing of the fiber connection loss of the photonic IC 10A, test light is input to the signal output port $P_{out}$ using a single-core spherical lensed fiber 40. In addition, a tap waveguide 132 is provided to a photonic waveguide 131 connected to the signal output port $P_{out}$, and a portion of the input test light is detected by the PD 15. The PD 15 is electrically connected to a test pad 31-9. By bringing a DC probe 30d into contact with the test pad 31-9, photocurrent of the test light is measured. The test light is input from the signal output port $P_{out}$ on the transmitter side, and is monitored adjacent to or in the vicinity of the signal output port $P_{out}$ to evaluate the fiber connection loss at the transmission frontend.

With this configuration, the connection loss at the edge of the transmitter side can be measured using a single optical fiber and a single DC probe 30d, and time-consuming core-alignment of a two-core fiber array is unnecessary. Besides, phase adjustment of the respective optical modulators 12a to 12d and power adjustment of the VOA2 and VOA3 are also unnecessary for the measurement of the connection loss. As a result, testing time for the fiber connection loss can be reduced.

For connection loss test at the signal input port $P_{in}$ of the receiver side of the photonic IC 10A, a part of the electrode pad array 31-2 is used. In this case, test light is input to the signal input port $P_{in}$ using a spherical lensed fiber 40, and photocurrent is measured at, the electrode pad connected to the mPD1. During actual services, the electrode pad array 31-2 is used for power monitoring of the received light.

For connection loss test at the common input port $P_{com}$, a part of the electrode pad array 31-3 is used. In this case, test light is input to the common input port $P_{com}$ using a spherical lensed fiber 40, while applying a probe onto an electrode pad connected to one of the PDs of the photodiode block 11 to measure the output current. In actual services, the electrode pad array 31-3 is used for extracting differential signals from the received light signal.

An electrode pad array 31-4 is not used during the connection loss test, but is used to input differential RF signals during actual services.

With the configuration of FIG. 3, optical axis alignment time of an optical fiber array, phase adjustment time of optical modulators, and power adjustment time of VOAs become unnecessary, and consequently, test time can be reduced.

Second Embodiment

Figure 4:
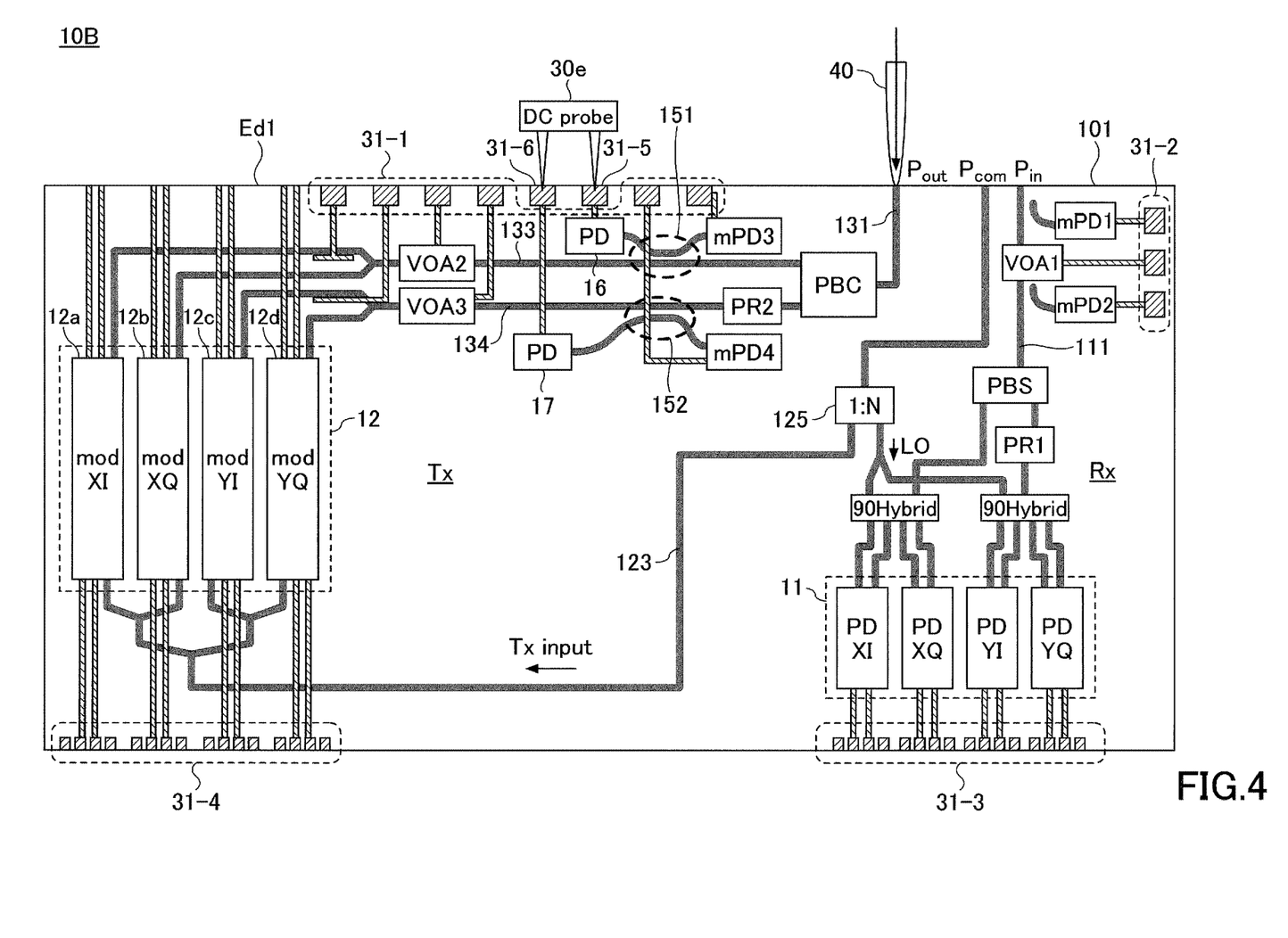
FIG. 4 is a schematic diagram of an optical device according to the second embodiment.

FIG. 4 is a schematic diagram of a photonic IC 10B according to the second embodiment. In the second embodiment, fiber connection loss is tested at the edge of the substrate 101 using a single optical fiber. In the above-described first embodiment, the fiber connection loss is measured in a time-efficient manner by making use of the signal output port $P_{out}$ of the transmitter side as a test light input port. However, insertion loss may be caused by a tap waveguide 132 provided near the signal output port $P_{out}$ for monitoring the input test light.

In the second embodiment, in order to suppress the insertion loss, optical couplers provided in the photonic waveguides 133 and 134 extending between the modulator block 12 and the polarization beam combiner PBC are designed as directional couplers 151 and 152 for extracting the test light. The directional couplers 151 and 152 are, for example, 2-input 2-output (2×2) directional couplers. PD 16 and PD 17 are connected to the directional couplers 151 and 152, respectively, to measure the inputted test light.

A monitor detector mPD3 is connected to one of the ports provided on one side of the directional coupler 151 in the optical axis direction, and a PD 16 is connected to one of the ports provided on the other side of the directional coupler 151. In actual services, a portion of the modulated optical signal output from one of the polarization branches is monitored by the monitor detector mPD3. In this case, the port connected to the monitor detector mPD3 becomes an output port of the directional coupler 151.

In the testing, test light is input from the signal output port $P_{out}$ and split into two by the polarization beam combiner "PBC". One of the split components of the test light is detected by PD 16. The port connected to the PD 16 becomes an output port of the directional coupler 151 for the test light. The PD 16 is electrically connected to a test pad 31-5.

A monitor detector mPD4 is connected to one of the ports provided on one side of the directional coupler 152 in the optical axis direction, and a PD 17 is connected to one of the ports provided on the other side of the directional coupler 151. In actual services, a portion of the modulated optical signal output from the other of the polarization branches is monitored by the monitor detector mPD4. In this case, the port connected to the monitor detector mPD4 becomes an output port of the directional coupler 152.

In the testing, test light is input from the signal output port $P_{out}$, and split into two by the polarization beam combiner "PBC". One of the split components of the test light is subjected to polarization rotation by a polarization rotator PR2, and detected by PD 17. The port connected to the PD 17 becomes an output port of the directional coupler 151 for the test light. The PD 17 is electrically connected to a test pad 31-6.

The output of the PD 16 and the output of the PD 17 are measured at the test pad 31-5 and the test pad 31-6, respectively, using a DC probe 30e.

In actual services, a light beam is input from the common input port $P_{com}$ and split by the 1: N optical coupler 125. One of the split components is input to the modulator block 12 through the photonic waveguide 123 and subjected to optical modulation. A portion of the modulated light output from one of the polarization branches is guided through the directional coupler 151 to the monitor detector mPD3 for monitoring the output power. A portion of the modulated light output from the other of the polarization branches is guided through the directional coupler 152 to the monitor detector mPD4 for monitoring the output power.

During the testing of the fiber connection loss of the signal input port $P_{in}$ at the receiver side, test light is input to the signal input port $P_{in}$ by the spherical lensed fiber 40. The test light is measured using the monitor detector mPD1 and a pad of the electrode pad array 31-2. In actual services, the electrode pad array 31-2 is used for power monitoring of the received light.

During the testing of the fiber connection loss of the common input port $P_{com}$, test light is input to the common input port $P_{com}$ by the spherical lensed fiber 40. The test light is measured using any one of the photodetectors in the photodetector block 11 and a part of electrode pad array 31-3. In actual services, the electrode pad array 31-3 is used for extracting differential photocurrents from the photodetector block 11.

The electrode pad array 31-4 is not used during the connection loss test, but is used for inputting differential RF signals in actual services.

With the configuration of FIG. 4, optical axis alignment time of an optical fiber array, phase adjustment time for VOA2 and VOA3 becomes unnecessary, and test time can be reduced. Because the directional couplers 151 and 152 connected to the monitor detectors mPD3 and mPD4 used in actual services can be utilized as test taps, increase in insertion loss due to adding extra tap waveguide is substantially reduced to almost zero.

Besides, fiber connection loss of the signal output port $P_{out}$ at the transmitter side can be evaluated for both polarizations of TE light and TM light, and the test performance is improved.

Third Embodiment

Figure 5:
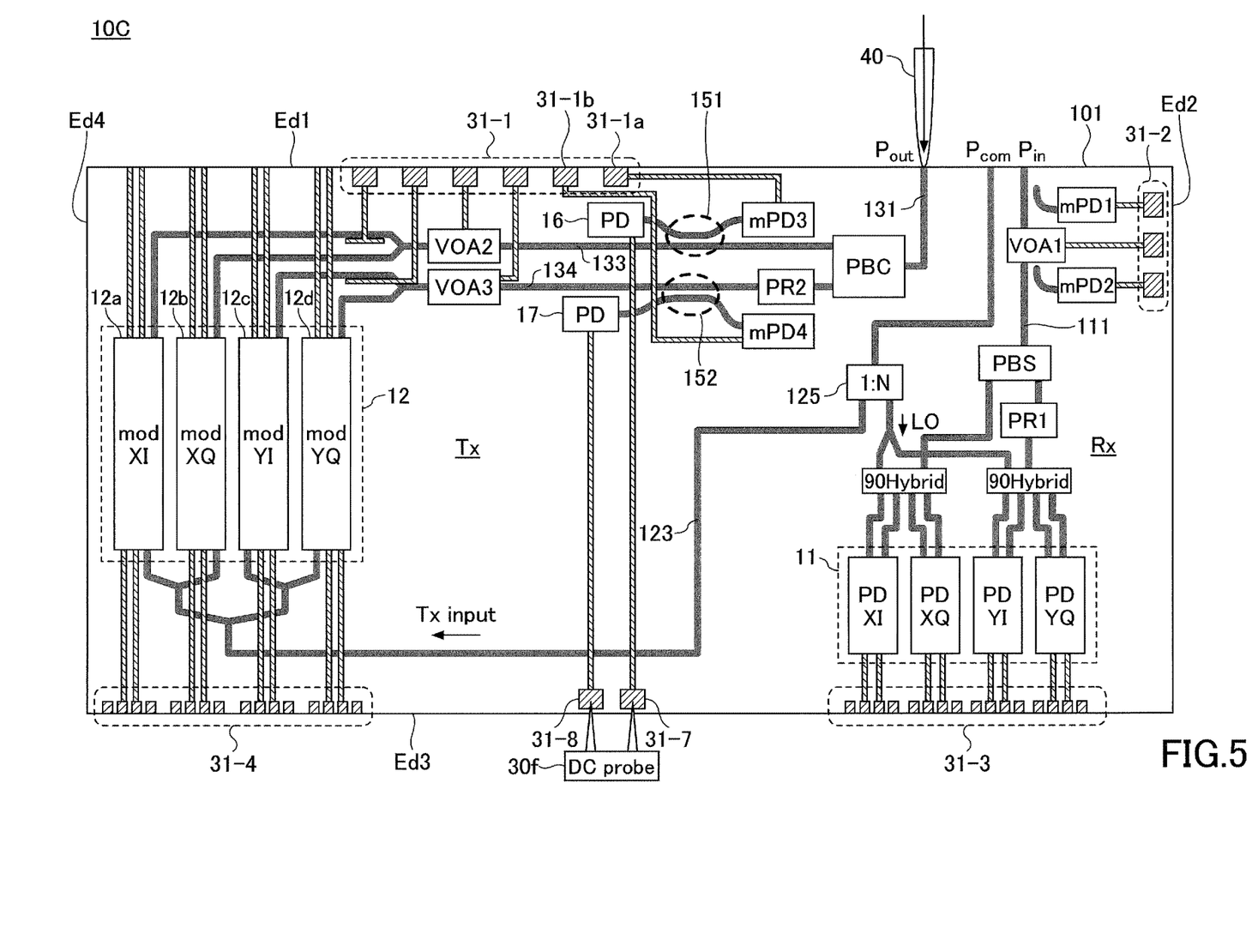
FIG. 5 is a schematic diagram of an optical device according to the third embodiment.

FIG. 5 is a schematic diagram of a photonic IC 10C according to the third embodiment. Also in the third embodiment, fiber connection loss is tested at the edge of the substrate 101 using a single optical fiber. In the second embodiment, the signal output port $P_{out}$ on the transmitter side is used as an input port for test light, and the test light is extracted and measured using the directional couplers 151 and 152, thereby achieving time-efficient measurement of fiber connection loss for TE light and TM light.

In the second embodiment, a group of electrode pads used in services and the test pads 31-5 and 31-6 co-exist at the first edge Ed1 of the photonic IC 10B, which may be an obstacle during the probe test or when providing the electrode pads.

In the third embodiment, the test pads for evaluating the connection loss of the signal output port $P_{out}$ are provided separately from the electrode pad array used in services. For example, the test pads are provided to or near the third edge Ed3 opposite to the first edge Ed1 so as to avoid interference in operation due to mixing up of pads.

At the transmitter (Tx) side of the photonic IC 10C, directional couplers 151 and 152 are provided in the photonic waveguides 133 and 134, respectively, between the modulator block 12 and the polarization beam combiner PBC. The monitor detector mPD3 is connected to one of the ports at one side of the directional coupler 151 in the optical axis direction, and the PD 16 is connected to one of the ports at the other side of the directional coupler 151. The monitor detector mPD4 is connected to one of the ports at one side of the directional coupler 152 in the optical axis direction, and the PD 17 is connected to one of the ports at the other side of the directional coupler 152.

In the testing, test light is input from the signal output port $P_{out}$, and split into two by the polarization beam combiner "PBC". One of the split components of the test light is guided to the PD 16 by the directional coupler 151. The direction of polarization of the other split component of the test light is rotated by 90 degrees at the polarization rotator PR2, and then guided to the PD 17 by the directional coupler 152.

The PD 16 is connected to a test pad 31-7 provided near the third edge Ed1 of the photonic IC 10C. The PD 17 is connected to a test pad 31-8 provided near the third edge Ed1, A DC probe 30f is brought into contact with the test pads 31-7 and 31-8 to measure the test light input from the signal output port $P_{out}$.

In actual services, a light beam is input from the common input port $P_{com}$ and split by the 1: N optical coupler 125. One of the split components is input to the respective optical modulators 12a to 12d of the modulator block 12, and modulated by RF signals input from electrode pad array 31-4.

Light components modulated at one of the polarization branches are combined and power-adjusted by VOA2, and further propagate through the photonic waveguide 133. A portion of the combined modulated light is branched at the directional coupler 151, and monitored by the monitor detector mPD3.

Light components modulated at the other of the polarization branches are combined and power-adjusted by VOA3, and further propagate through the photonic waveguide 134. A portion of the combined modulated light is branched at the directional coupler 152, and monitored by the monitor detector mPD4.

The configurations and operations, other than the positions of the test pads 31-7 and 31-8, of the crotonic IC 10C are the same as those of the photonic IC 10B of the second embodiment. The same elements are denoted by the same symbols, and redundant explanation will be omitted.

In the third embodiment, fiber connection loss arising at the edge of the substrate 101 can be evaluated in a short time for both TB light and TM light. Because the test pads 31-7 and 31-8 are provided separately from other electrode pad arrays, interference between the spherical lensed fiber 40 and the DC probe 30f is prevented, and implementation of the electrode pad array is facilitated.

Fourth Embodiment

Figure 6:
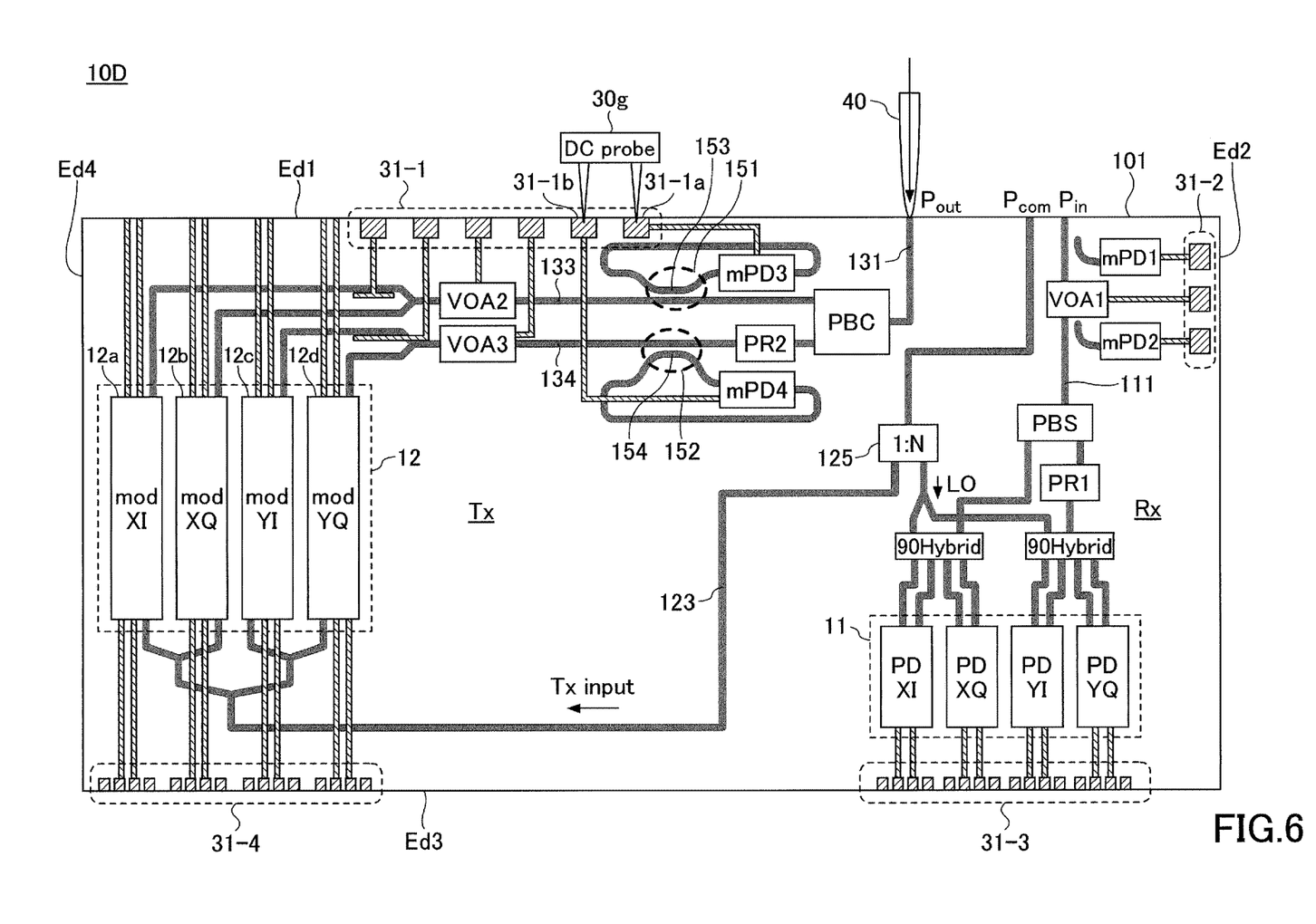
FIG. 6 is a schematic diagram of an optical device according to the fourth embodiment.

FIG. 6 is a schematic diagram of a photonic IC 10D according to the fourth embodiment. Also in the fourth embodiment, fiber connection loss is tested at the edge of the substrate 101 using a single optical fiber. In the second and third embodiments, fiber connection loss can be tested in a time-efficient manner for both the TE light and the TM light by providing a specific area for arranging test pads on the chip.

In the fourth embodiment, fiber connection loss is tested at the edge of the substrate 101 using directional couplers, and by making use of the monitor detectors mod's and electrode pads that are actually used in services.

At the transmitter side of the photonic IC 10D, directional couplers 151 and 152 are provided in the photonic waveguides 133 and 134, respectively, between the modulator block 12 and the polarization beam combiner "PBC". The directional couplers 151 and 152 are 2×2 optical couplers in this example.

In the directional coupler 151, one end of a photonic waveguide 153 arranged in parallel with the photonic waveguide 133 is connected to one terminal of the monitor detector mPD3, and the other end of the photonic waveguide 153 is connected to the other terminal of the monitor detector mPD3. A closed optical path is formed by the photonic waveguide 153 and the monitor detector mPD3.

In the directional coupler 152, one end of a photonic waveguide 154 arranged in parallel with the photonic waveguide 134 is connected to one terminal of the monitor detector mPD4, and the other end of the photonic waveguide 154 is connected to the other terminal of the monitor detector mPD4. A closed optical path is formed by the photonic waveguide 154 and the monitor detector mPD4.

During the test, the test light input from the signal output port $P_{out}$ is split by the polarization beam combiner "PBC". One of the split components of the test light is incident on the mPD3 through the directional coupler 151. The polarization direction of the other split component, of the test light is rotated by 90 degrees by the polarization rotator PR2, and then guided to the mPD4 by the directional, coupler 152.

The monitor detector mPD3 is connected to the electrode pad 31-1a in the electrode pad array 31-1 provided to the first edge Ed1 of the photonic IC 10D. The monitor detector mPD4 is connected to the electrode pad 31-1b in the electrode pad array 31-1.

While the test light is input to the signal output port $P_{out}$ using a spherical lensed fiber 40, the DC probe 30g is brought into contact with the electrode pads 31-1a and 31-1b to measure the test light.

In actual services, light input from the common input port $P_{com}$ is split by the 1: N optical coupler 125, and one of the split light components is guided to the transmitter (Tx) side. The light supplied to the transmitter (Tx) side is further branched and input to the respective optical modulators 12a to 12d and modulated by RF signals input from the electrode pad array 31-4. The light components modulated at one of the polarization branches are combined and power-adjusted by the VOA2. The power-adjusted light signal further propagates through the photonic waveguide 133. A portion of the light signal is branched by the directional coupler 151 and monitored by the monitor detector mPD3.

The light components modulated at the other polarization branch are combined and power-adjusted by the VOA3. The power-adjusted light signal further propagates through the photonic waveguide 134. A portion of the light signal is branched by the directional coupler 152 and monitored by the monitor detector mPD4.

In the fourth embodiment, fiber connection loss at the edge of the substrate 101 can be tested in a short time for both TE light and TM light. By making use the monitor detectors mPD3 and mPD4 used in actual services for the testing of the fiber connection loss, the area size required for the testing on the chip can be reduced. This results in downsizing of the photonic IC 10D itself. Because there is no need to pay attention to the layout of the test pads, design of the photonic IC 10D is facilitated.

<Application of Optical Module>

Figure 7:
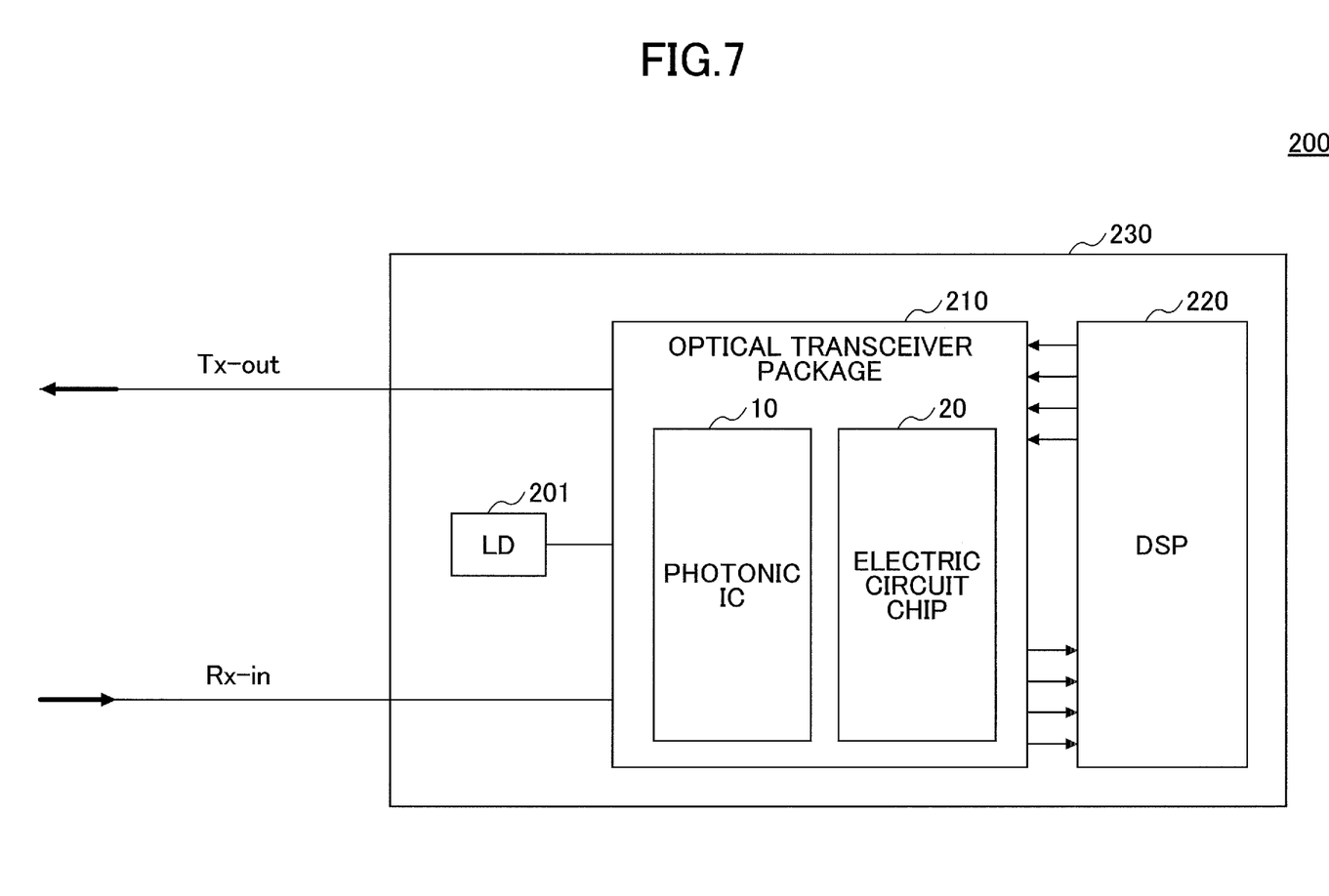
FIG. 7 illustrates an example of an optical module using an optical device of an embodiment.

FIG. 7 is a schematic diagram of an application of photonic ICs 10A to 10D (which may be comprehensively referred to as "optical device 10"). The optical device 10 of an embodiment may be housed in a single package together with an electric circuit chip 20 to form an optical transceiver package 210. The optical transceiver package 210 is an example of an optical module.

The electric circuit chip 20 includes, for example, a driver circuit for driving the optical modulators 12a to 12d at high frequency, and a transimpedance amplifier for converting the photocurrent output from each PD of the photodetector block 11 into a voltage signal.

The optical transceiver package 210 may be housed in a package 230 together with a ID 201 and a DSP 220 to assemble an optical transceiver 200. The optical transceiver 200 is also an example of the optical module.

In the optical device 10, fiber connection loss has already been tested at each of the signal input port $P_{in}$ of the receiver side, the signal output port $P_{out}$ of the transmitter side, and the common input port $P_{com}$, and the performance is guaranteed. Because the time required for testing the fiber connection loss is shortened, the production efficiency of the optical transceiver package 210 or the optical transceiver 200 is improved.

The above-described embodiments are just examples, and various modifications and substitutions are possible. The configuration of the modulator block 12 of the optical device 10 is applicable not only to the DP-QPSK modulation scheme, but also to a configuration in which multiple signal paths or channels are formed by photonic waveguides for 16 quadrature amplitude modulation (16 QAM), quadrature phase shift keying (QPSK), or other modulation schemes. In such cases, time required for testing fiber connection is reduced at signal input port $P_{in}$ of the receiver side, the signal output port $P_{out}$ of the transmitter side, or the common input port $P_{com}$.

In the first embodiment (FIG. 3), the positions of the tap waveguide 132, the PD 15, and the test pad 31-9 are not limited to those between the signal output port $P_{out}$ and the common input port $P_{com}$. The tap waveguide 132, the PD 15, and the test pad 31-9 may be provided at other positions on the chip as long as the test light input from the signal output port $P_{out}$ can be monitored. In the third embodiment (FIG. 5), the test pads 31-7 and 31-8 may not always be provided near the third edge Ed3. The test pads 31-7 and 31-8 may be provided near the second edge Ed2 or the fourth edge Ed4 as long as there is no adverse influence to other optical elements.

In either case, the optical device 10 is effectively used for a compact package in which an optical transmitter function and an optical receiver function are integrated on one chip. Because the time required for testing fiber connection loss at the edge of the chip is reduced, the device performance and the production efficiency are improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A test method for an optical device, comprising:
   inputting a test light to an output port provided at an edge of a substrate of the optical device having been cut into a chip, the output port being used to output a transmission signal during service;
   when the test light is input from the output port, detecting the test light propagating in a direction opposite to a signal output direction in which the transmission signal is transmitted from an optical transmitter circuit to the output port, by a photodetector;
   branching a photonic waveguide between the output port and the optical transmitter circuit and providing a tap waveguide to the photonic waveguide, one end of the tap waveguide being connected to a first detector and the other end of the tap waveguide being connected to a second detector;
   monitoring at the first detector a portion of the optical signal during the service, and detecting at the second detector a portion of the test light during the test; and
   evaluating fiber connection loss of the first output port based upon a detection result.

2. The test method as claimed in claim 1, comprising:
   bringing a probe into contact with a pad connected to the second detector; and
   measuring a detected level of the test light.

3. An optical device comprising:
   an optical device comprising:
   an optical transmitter circuit formed in a substrate:
   an output port that outputs an optical signal generated by the optical transmitter circuit during services,
   a photodetector configured to detect a test light propagating in a direction opposite to a signal output direction in which the optical signal is transmitted from the optical transmitter circuit to the output port, when the test light is input from the output port during a test;
a photonic waveguide branched between the output port and the optical transmitter circuit; and
a tap waveguide provided to the photonic waveguide,
wherein one end of the tap waveguide is connected to a first detector and the other end of the tap waveguide is connected to a second detector; and
wherein the first detector monitors a portion of the optical signal during the service, and the second detector detects a portion of the test light serving as the photodetector during the test.

4. The optical device as claimed in claim 3, comprising:
a second photonic waveguide branched between the output port and the optical transmitter circuit;
and
a second tap waveguide provided to the second photonic waveguide,
wherein one end of the second tap waveguide is connected to a third detector and the other end of the tap waveguide is connected to a fourth; and
wherein the third detector monitors a portion of the optical signal during the service, and the fourth detector detects a portion of the test light serving as the photodetector during the test.

5. The optical device as claimed in claim 4, comprising:
a first test pad connected to the first detector; and
a second test pad connected to the third detector,
wherein the first test pad and the second test pad are provided on a same edge of the optical device as an electrode pad array connected to an output of an optical modulator of the optical transmitter circuit.

6. The optical device as claimed in claim 4, comprising:
a first test pad connected to the first detector; and
a second test pad connected to the third detector,
wherein the first test pad and the second test pad are provided on an edge of the optical device opposite to an edge of the optical device on which an electrode pad array connected to an output of an optical modulator of the optical transmitter circuit is provided.

7. The optical device as claimed in claim 4,
wherein at least one of the tap waveguide and the second tap waveguide is a 2X2 optical coupler.

8. An optical module comprising:
the optical device as claimed in claim 3; and
a light source to supply light to the optical device.

9. An optical module comprising:
the optical device as claimed in claim 3; and
an electric circuit chip connected to the optical device.

10. An optical device comprising:
an optical transmitter circuit formed in a substrate:
an output port that outputs an optical signal generated by the optical transmitter circuit during service;
a photodetector configured to detect a test light propagating in a direction opposite to a signal output direction in which the optical signal is transmitted from the optical transmitter circuit to the output port, when the test light is input from the output port during a test:
a photonic waveguide branched between the output port and the optical transmitter circuit;
a directional coupler provided to the photonic waveguide;
a monitor detector connected to the directional coupler,
wherein the photodetector is the monitor detector connected to the directional coupler, and the monitor detector monitors a portion of the optical signal during the service and detects a portion of the test light during the test.

11. The optical device as claimed in claim 10, comprising:
a second photonic waveguide branched between the output port and the optical transmitter circuit;
and
a second directional coupler provided to the second photonic waveguide; and
a second monitor detector connected to the second directional coupler and configured to monitor a second portion of the optical signal in the service and detect a second portion of the test light during the test.

12. The optical device as claimed in claim 11,
wherein a photonic waveguide of the directional coupler forms a first closed optical path including the monitor detector, and
wherein a photonic waveguide of the second directional coupler forms a second closed optical path including the second monitor detector.

13. The optical device as claimed in claim 11,
wherein at least one of the directional coupler and the second directional coupler is a 2X2 optical coupler.

14. An optical module comprising:
the optical device as claimed in claim 10; and
a light source to supply light to the optical device.

15. An optical module comprising:
the optical device as claimed in claim 10; and
an electric circuit chip connected to the optical device.

16. A test method for an optical device, comprising:
inputting a test light to an output port provided at an edge of a substrate of the optical device having been cut into a chip, the output port being used to output a transmission signal during service;
when the test light is input from the output port, detecting the test light propagating in a direction opposite to a signal output direction in which the transmission signal is transmitted from an optical transmitter circuit to the output port, by a photodetector;
branching a photonic waveguide between the output port and the optical transmitter circuit and providing a directional coupler to the photonic waveguide;
connecting a monitor detector as the photodetector to the directional coupler;
at the monitor detector, monitoring a portion of the optical signal during the service and detecting a portion of the test light during the test; and
evaluating fiber connection loss of the output port based upon a detection result.

* * * * *